United States Patent
Morrison, Jr. et al.

(10) Patent No.: US 7,186,770 B2
(45) Date of Patent: *Mar. 6, 2007

(54) UNFINISHED RUTILE TITANIUM DIOXIDE SLURRY FOR PAINTS AND PAPER COATINGS

(75) Inventors: William Harvey Morrison, Jr., Wilmington, DE (US); Brian William Sullivan, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 184 days.

This patent is subject to a terminal disclaimer.

(21) Appl. No.: 10/478,622

(22) PCT Filed: Feb. 25, 2002

(86) PCT No.: PCT/US02/05803

§ 371 (c)(1),
(2), (4) Date: Nov. 17, 2003

(87) PCT Pub. No.: WO03/008511

PCT Pub. Date: Jan. 30, 2003

(65) Prior Publication Data

US 2004/0162383 A1    Aug. 19, 2004

(51) Int. Cl.
*C08K 3/22*    (2006.01)

(52) U.S. Cl. ...................................... 524/497
(58) Field of Classification Search ................. 524/497
See application file for complete search history.

(56) References Cited

U.S. PATENT DOCUMENTS

| | | | |
|---|---|---|---|
| 3,542,575 A | 11/1970 | Nelson | |
| 3,549,091 A | 12/1970 | Slepetys | |
| 3,686,111 A | 8/1972 | Makhlouf et al. | |
| 3,767,455 A | 10/1973 | Claridge et al. | |
| 3,884,871 A | 5/1975 | Herman et al. | |
| 4,127,422 A | 11/1978 | Guzi, Jr. et al. | |
| 4,177,081 A | 12/1979 | DeColibus | |
| 4,227,935 A | 10/1980 | Blake et al. | |
| 4,430,001 A | 2/1984 | Schurr | |
| 4,656,226 A | 4/1987 | Hutchins et al. | |
| 4,680,352 A | 7/1987 | Janowicz et al. | |
| 4,687,789 A | 8/1987 | Gonnet et al. | |
| 4,722,984 A | 2/1988 | Janowicz | |
| 4,755,563 A | 7/1988 | West | |
| 4,812,517 A | 3/1989 | West | |
| 4,985,160 A | 1/1991 | Henry et al. | |
| 4,997,870 A | 3/1991 | Schilling et al. | |
| 5,085,698 A | 2/1992 | Ma et al. | |
| 5,231,131 A | 7/1993 | Chu et al. | |
| 5,310,778 A | 5/1994 | Shor et al. | |
| 5,318,624 A | 6/1994 | Corbin | |
| 5,332,433 A | 7/1994 | Story et al. | |
| 5,356,470 A | 10/1994 | Ott et al. | |
| 5,393,510 A | 2/1995 | Blumel et al. | |
| 5,630,873 A | 5/1997 | Weiser et al. | |
| 5,653,793 A | 8/1997 | Ott et al. | |
| 5,705,033 A | 1/1998 | Gerard et al. | |
| 5,739,202 A | 4/1998 | Pecsok | |
| 5,746,819 A | 5/1998 | Kostelnik et al. | |
| 5,804,639 A | 9/1998 | Schopwinkel et al. | |
| 5,821,283 A | 10/1998 | Hesler et al. | |
| 5,824,145 A | 10/1998 | Marganski et al. | |
| 5,824,146 A | 10/1998 | Ott | |
| 5,859,113 A | 1/1999 | McIntyre et al. | |
| 5,989,331 A | 11/1999 | Bauer et al. | |
| 6,005,023 A | 12/1999 | Anton et al. | |
| 6,790,902 B2 * | 9/2004 | Morrison et al. | 524/497 |
| 2003/0108667 A1 | 6/2003 | McIntyre et al. | |
| 2004/0250735 A1 | 12/2004 | McIntyre et al. | |

FOREIGN PATENT DOCUMENTS

| | | |
|---|---|---|
| EP | 0549163 | 6/1993 |
| EP | 0 622 429 A2 | 11/1994 |
| EP | 0502576 | 5/1995 |
| EP | 0769522 | 4/1997 |
| EP | 0811654 | 12/1997 |
| EP | 0 826 751 A2 | 3/1998 |
| EP | 0732379 | 4/1999 |
| EP | 1070739 | 1/2001 |
| WO | WO 91 18951 | 12/1991 |
| WO | WO 93 12184 | 6/1993 |

OTHER PUBLICATIONS

PCT Search Report, Oct. 16, 2002.

* cited by examiner

*Primary Examiner*—Edward J. Cain

(57) ABSTRACT

The present invention relates to a rutile titanium dioxide slurry made directly from an unfinished titanium dioxide pigment produced from either the chloride or sulfate process.

2 Claims, No Drawings

UNFINISHED RUTILE TITANIUM DIOXIDE SLURRY FOR PAINTS AND PAPER COATINGS

Although there have been unfinished rutile titanium dioxide pigment slurries formulated for applications in paper wet-end and for paper coatings, there was little progress made in the formulation of a rutile titanium dioxide slurry product for architectural paint systems.

Architectural paint systems are formulated over a wide range of titanium dioxide concentrations and include a variety of other pigments and additives to ensure good paint performance for both exterior and interior coatings. In particular, architectural paints are generally formulated to work with universal colorants. Thus, a retail paint store need only stock several types of tint base and a range of colorants to produce, in the retail store, paints tinted to meet the customer selection from a paint color card.

Before the present invention, there was no formulation of an unfinished titanium dioxide slurry product that provided satisfactory performance in the vast varieties of coating formulations used in the consumer markets particularly where custom or universal colorant are in common use.

BRIEF SUMMARY OF THE INVENTION

The present invention relates to a rutile titanium dioxide slurry made directly from an unfinished titanium dioxide pigment produced from either the chloride or sulfate process.

The present invention is a rutile titanium dioxide pigment slurry comprising an unfinished rutile titanium dioxide pigment, a dispersant and an organic amine. The dispersant is selected from the group consisting of (a) a graft copolymer comprising about 90 to 50% by weight of a polymeric backbone and correspondingly about 10 to 50% by weight of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight based on the weight of the graft copolymer, of polymerized ethylenically unsaturated acid containing monomers; and (2) the side chains are hydrophilic macromonomers attached to the backbone at a single terminal point and consist essentially of polymerized ethylenically unsaturated monomers polymerized in the presence of a cobalt chain transfer agent and contain 20 to 50% by weight, based on the weight of the macromonomer, of polymerized ethylenically unsaturated acid containing monomers and have a weight average molecular weight of about 1,000 to 30,000 and wherein the acid groups of the graft copolymer are neutralized with an inorganic base or an amine; and (b) a block copolymer of type AB and BAB selected from the group consisting of BMA//MAA (10//10) and BMA//BMA/MMA (10//5/10).

The present invention also includes a process for making slurry from unfinished rutile titanium dioxide pigment comprising the steps of:

(a) mixing a dispersant into water and adjusting the pH to a value from about 7 to 10 using an organic amine to form a dispersant solution;

(b) adding to the dispersant solution sufficient unfinished rutile titanium dioxide pigment to produce a mixture having a pigment concentration of from about 80 to 85% by weight unfinished titanium dioxide pigment;

(c) grinding the mixture using a high speed disperser under dilatant shear conditions; and (d) adding water or water and amine to reduce pigment concentration of the mixture to from about 80% to about 72% and screening the resulting mixture;

wherein the dispersant is selected from the group consisting of (a) a graft copolymer comprising about 90 to 50% by weight of a polymeric backbone and correspondingly about 10 to 50% by weight of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight based on the weight of the graft copolymer, of polymerized ethylenically unsaturated acid containing monomers; and (2) the side chains are hydrophilic macromonomers attached to the backbone at a single terminal point and consist essentially of polymerized ethylenically unsaturated monomers polymerized in the presence of a cobalt chain transfer agent and contain 20 to 50% by weight, based on the weight of the macromonomer, of polymerized ethylenically unsaturated acid containing monomers and have a weight average molecular weight of about 1,000 to 30,000 and wherein the acid groups of the graft copolymer are neutralized with an inorganic base or an amine; and (b) a block copolymer of type AB and BAB selected from the group consisting of BMA//MAA (10//10) and BMA//BMA/MMA (10//5/10).

The present invention also includes a method to make an unfinished rutile titanium dioxide pigment slurry suitable for use in architectural paints and paper coatings directly from oxidation product of a chloride process, the method comprising the steps of:

(a) without subjecting the unfinished titanium dioxide pigment to any particle size reduction steps and without subjecting the pigment to any wet treatments, incorporating unfinished rutile titanium dioxide pigment direct from oxidation into water containing a dispersant and an organic amine to form a mixture wherein the organic amine is at sufficient concentration so that the mixture at a pH of between about 7 and about 10 and the concentration of the pigment in the mixture is from about 80 to about 85% weight of the mixture;

(b) grinding the mixture of step (a) using high speed disperser under dilatant shear conditions; and (c) adding water or water and amine to reduce pigment concentration of the mixture from step (b) to from about 80% to about 72% and screening the resulting mixture; and (d) milling the resulting mixture from step (c) in a media mill;

and wherein the dispersant is selected from the group consisting of (a) a graft copolymer comprising about 90 to 50% by weight of a polymeric backbone and correspondingly about 10 to 50% by weight of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight based on the weight of the graft copolymer, of polymerized ethylenically unsaturated acid containing monomers; and (2) the side chains are hydrophilic macromonomers attached to the backbone at a single terminal point and consist essentially of polymerized ethylenically unsaturated monomers polymerized in the presence of a cobalt chain transfer agent and contain 20 to 50% by weight, based on the weight of the macromonomer, of polymerized ethylenically unsaturated acid containing monomers and have a weight average molecular weight of about 1,000 to 30,000 and wherein the acid groups of the graft copolymer are neutralized with an inorganic base or an amine; and (b) a block copolymer of type AB and BAB selected from the group consisting of BMA//MAA (10//10) and BMA//BMA/ MMA (10//5/10).

The present invention also provides a method to make an unfinished rutile titanium dioxide pigment slurry suitable for use in architectural paints and paper coatings directly from calcination product of a sulfate process, the method comprising the steps of:

(a) without subjecting the unfinished titanium dioxide pigment to any particle size reduction steps and without subjecting the pigment to any wet treatments, incorporating unfinished rutile titanium dioxide pigment direct from calcination into water containing a dispersant and an organic amine to form a mixture wherein the organic amine is at sufficient concentration so that the mixture at a pH of between about 7 and about 10 and the concentration of the pigment in the mixture is from about 80 to about 85% weight of the mixture;

(b) grinding the mixture of step (a) using high speed disperser under dilatant shear conditions; and (c) adding water or water and amine to reduce pigment concentration of the mixture from step (b) to from about 80% to about 72% and screening the resulting mixture; and (d) milling the resulting mixture from step (c) in a media mill;

and wherein the dispersant is selected from the group consisting of (a) a graft copolymer comprising about 90 to 50% by weight of a polymeric backbone and correspondingly about 10 to 50% by weight of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight based on the weight of the graft copolymer, of polymerized ethylenically unsaturated acid containing monomers; and (2) the side chains are hydrophilic macromonomers attached to the backbone at a single terminal point and consist essentially of polymerized ethylenically unsaturated monomers polymerized in the presence of a cobalt chain transfer agent and contain 20 to 50% by weight, based on the weight of the macromonomer, of polymerized ethylenically unsaturated acid containing monomers and have a weight average molecular weight of about 1,000 to 30,000 and wherein the acid groups of the graft copolymer are neutralized with an inorganic base or an amine; and (b) a block copolymer of type AB and BAB selected from the group consisting of BMA//MAA (10//10) and BMA//BMA/ MMA (10//5/10).

DETAILED DESCRIPTION OF THE INVENTION

The term "unfinished rutile titanium dioxide pigment" means a pigment that has not been wet treated to deposit metal oxides on the pigment surface or processed to deposit organic surface treatments on the pigment.

In the chloride process unfinished pigment is sometimes known as oxidation base or base pigment. In the chloride process unfinished titanium dioxide pigment is pigment that is directly removed from the oxidation section; and in the sulfate process, unfinished titanium dioxide pigment is pigment removed from the calcination step before any wet treatment is applied to the pigment.

Unfinished pigment may be processed by various steps to remove impurities from the oxidation or precipitation process. In the chloride process, for example, the pigment may be processed to remove salt or chlorine. In the sulfate process, the pigment may be washed to remove impurities. Also unfinished titanium dioxide pigment includes pigment formed when various metal oxide precursors are added in the oxidation step of the chloride process. Such so-called co-oxidized materials, including the chlorides of aluminum, phosphorous, silicon, and the like, may be incorporated into the pigment during oxidation to control particle size and other pigment properties of the oxidation base.

Unfinished pigment does not include pigment that has been wet treated or treated with various organic agents typically used to improve dispersion properties of commercial titanium dioxide pigment products.

The term "slurry" as used herein is a high concentration of titanium dioxide dispersed in water. The concentration of the pigment at least 60% of the weight of the slurry and preferred to be in the range of from about 70 to about 85%.

The graft copolymer dispersant of the present invention prepared by the process set forth herein is efficiently prepared and 100% graft copolymer is formed and not a mixture of graft copolymer and low molecular weight backbone polymer and copolymerized macromonomer segments as has generally been the case with prior art process used for making graft copolymers.

The graft copolymer contains about 50–90% by weight of polymeric backbone and correspondingly about 10–50% by weight of sidechains. The graft copolymer has a weight average molecular weight of about 4,000–100,000 and preferably about 10,000–40,000. The side chains of the graft copolymer are formed from hydrophilic macromonomers that have a weight average molecular weight of about 1,000–30,000 and preferably 2,000–5,000 and contain about 2–100% by weight and preferably 20–50% by weight, based on the weight of the macromonomer, of polymerized ethylenically unsaturated acid monomers. These sidechains are hydrophilic and keep the dispersant and pigments uniformly dispersed in the pigment dispersion and in the resulting coating composition.

The backbone of the graft copolymer in hydrophobic relative to the sidechains and may contain up to 20% by weight, preferably 1–10% by weight, based on the weight of the graft copolymer, of polymerized ethylenically unsaturated acid monomers which are listed hereinafter. The backbone contains polymerized hydrophobic monomers such as alkyl methacrylates and acrylates, cycloaliphatic methacrylates and acrylates and aryl methacrylates and acrylates as are listed hereinafter and also may contain up to 30% by weight, based on the weight of the graft copolymer, of polymerized ethylenically unsaturated non-hydrophobic monomers which may contain functional groups. Examples of such monomers are hydroxy ethyl acrylate, hydroxy ethyl methacrylate, t-butylamino ethyl methacrylate, diethyl amino ethyl acrylate, diethyl amino ethyl methacrylate, acrylamide, nitro phenol acrylate, nitro phenol methacrylate, phthalimido methyl acrylate, phthalimido methacrylate, acrylic acid, acryloamido propane sulfonic acid.

The backbone of the graft copolymer has an affinity for the surface of the pigment used in the dispersion and anchors the copolymer to the pigment and keeps the pigment dispersed and prevents the graft copolymer from returning to the aqueous phase. Reactive groups on the backbone can react with the pigment and form a bond with the pigment.

Molecular weights are determined by Gel Permeation Chromatography using polystyrene as a standard.

The macromonomer contains a single terminal ethylenically unsaturated group which is polymerized into the backbone of the graft copolymer and primarily contains polymerized monomers of methacrylic acid, its esters, nitriles, amides or mixtures of these monomers.

Typical alkyl methacrylates that can be used have 1–8 carbon atoms in the alkyl group and are, for example, methyl methacrylate, ethyl methacrylate, propyl methacrylate, isopropyl methacrylate, butyl methacrylate, pentyl methacrylate, hexyl methacrylate, 2-ethyl hexyl methacrylate and the like.

Cycloaliphatic methacrylates also can be used such as trimethylcyclohexyl methacrylate, isobutylcyclohexyl methacrylate, and the like. Aryl methacrylates also can be used such as benzyl methacrylate. Other polymerizable monomers that can be used are styrene, alpha methyl styrene, methacrylamide and methacrylonitrile. The above monomers can also be used in the backbone of the graft copolymer.

The macromonomer can contain 2–100% by weight, preferably about 20–50% by weight, based on the weight of the macromonomer, of polymerized ethylenically unsaturated acid. Methacrylic acid is preferred particularly if it is the sole constituent. Other acids that can be used are ethylenically unsaturated carboxylic acids such as acrylic acid, itaconic acid, maleic acid and the like. Ethylenically unsaturated sulfonic, sulfinic, phosphoric or phosphonic acid and esters thereof also can be used such as styrene sulfonic acid, acrylamido methyl propane sulfonic acid, vinyl phosphonic acid and its esters and the like. The above acids also can be used in the backbone of the graft copolymer.

Up to 40% by weight, based on the weight of the macromonomer, of other polymerized ethylenically unsaturated monomers can be present in the macromonomer. Primarily alkyl acrylates having 1–12 carbons in the alkyl group can be used such as methyl acrylate, ethyl acrylate, propyl acrylate, isopropyl acrylate, butyl acrylate, pentyl acrylate, hexyl acrylate, 2-ethyl acrylate, nonyl acrylate, lauryl acrylate and the like can be used. Cycloaliphatic acrylates can be used such as trimethylcyclohexyl acrylate, t-butyl cyclohexyl acrylate and the like. Aryl acrylates such as benzyl acrylate also can be used. The above monomers also can be used in the backbone of the graft copolymer.

One preferred macromonomer contains about 50–80% by weight of polymerized methyl methacrylate and 20–50% by weight of polymerized methacrylic acid and has a weight average molecular weight of about 2,000–5,000.

To ensure that the resulting macromonomer only has one terminal ethylenically unsaturated group which will polymerize with the backbone monomers to form the graft copolymer, the macromonomer is polymerized by using a catalytic chain transfer agent that contains a $CO^{+2}$ group, i.e. a cobalt chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional azo type polymerization catalyst such as 2,2'-azobis(2-methylbutanenitrile) and 2,2'-azobis(2,4'-dimethylpentanenitrile) 2,2'-azobis(2,4-dimethyl-4-methoxyvaleronitrile) are added and polymerization is continued until a macromonomer is formed for the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis(borondifluorodimethylglyoximato) cobaltate(II) and diaquabis(borondifluorophenylglyoximato) cobaltate (II). Typically these chain transfer agents used at concentrations of about 5–1000 ppm based on the monomers used.

After the macromonomer is formed as described above, optionally solvent is stripped off and the backbone monomers are added to the macromonomer along with additional solvent and polymerization catalyst. Any of the aforementioned azo type catalyst can be used as can other suitable catalyst such as peroxides and hydroperoxides. Typical of such catalyst are di-tertiarybutyl peroxide, di-cumylperoxide, tertiaryamyl peroxide, cumenehydroperoxide, di(n-propyl) peroxydicarbonate, peresters such as amyl peroxyacetate and the like. Polymerization is continued usually at the reflux temperature of the reaction mixture until a graft copolymer is formed of the desired molecular weight.

Typical solvents that can be used to form the macromonomer or the graft copolymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as tetrahydrofuran, ethylene glycol mono butyl ether and the like.

After the graft copolymer is formed, it is neutralized with an amine or an inorganic base such as ammonium hydroxide or sodium hydroxide and then water is added to form a dispersion. Typical amines that can be used include amino methyl propanol, amino ethyl propanol, dimethyl ethanol amine, triethylamine and the like. One preferred amine is amino methyl propanol and the preferred inorganic base is ammonium hydroxide.

Particularly useful graft copolymers include the following:

a graft copolymer having a backbone of polymerized methyl acrylate and butyl acrylate and side chains of a macromonomer having a weight average molecular weight of about 2,000–5,000 and containing about 50–80% by weight, based on the weight of the macromonomer, of polymerized methyl methacrylate and 20–50% by weight, based on the weight of the macromonomer, of polymerized methacrylic acid.

a graft copolymer having a backbone of polymerized methyl acrylate and butyl acrylate and acrylamido methyl propane sulfonic acid and side chains of the above macromonomer.

a graft copolymer having a backbone of polymerized methyl acrylate and butyl acrylate and acrylic acid and side chains of the above macromonomer.

a graft copolymer having a backbone of polymerized ethyl acrylate and side chains of the above macromonomer.

a graft copolymer having a backbone of polymerized ethyl acrylate, methyl acrylate and acrylic acid and side chains of the above macromonomer.

a graft copolymer having a backbone of polymerized ethyl acrylate and acrylic acid and side chains of the above macromonomer.

The term "dilatant shear conditions" as used herein means mechanical energy applied to a high solids slurry of high viscosity such that it is barely fluid. The particles interfere with each other as they try to flow. This generates local shear rates that are higher than the thick slurry can tolerate thus producing localized dilatancy, i.e., rapid increase in shear stress for a slight increase in shear rate. These high shear stress zones then break up the agglomerates resulting in improved dispersion.

Typically, slurry composition that suitably combine with high speed disperser to provide dilatant slurry grinding conditions in the present invention have above about 80% by weight of solids, preferably about 81 to 83% by weight of solids.

Preferred organic amines for use in the present invention include alcohol amines such as 2-amino-2-methyl-1-propanol (AMP) and mono-isopropanol amine (MIPA) and the like.

The concentration of the dispersant of the present invention is from 0.2 to 1% by weight on the pigment. The preferred range of dispersant concentration is from 0.5 to 1%.

In performing the high-speed pigment grind in the present invention, it is preferred to add the pigment to the mixture of water, amine and the dispersant as fast as possible. The grind is complete once all the pigment is in. This makes the present invention particularly useful in a continuous plant operation.

The present process may be operated as a batch or continuous process. For batch slurry processing, the unfinished titanium dioxide pigment is typically added to a tank that already has water and the dispersant present along with some or all of the organic amine. The amount of the water, pigment and dispersant used in the grind will be dependent on the size of the tank. The solids level in the tank is slowly increased over time. Dilatant slurry grinding occurs as the desired % solids are finally reached.

It is a particular advantage that the process of this invention can be conducted continuously. Preferably, this process is operated continuously in a tank to give greatly increased production capacity. Dry unfinished titanium dioxide pigment may be continuously and simultaneously added to a tank along with water and the dispersant, such that the tank is always maintained at the desired % solids for good dilatant slurry grinding to occur. Simultaneously with the addition of new material, a portion of the material in the tank is continuously withdrawn, typically from the bottom of the tank by gravity flow, a conveying screw or the like. The material that is withdrawn is immediately diluted with water to give sufficient fluidity for subsequent processing. An alcohol amine may be added simultaneously or separately with the addition of water. Mixing after the addition of water to the dilatant slurry water typically takes place using a disperser using a separate tank, pump or the like. For batch or continuous mode, the slurry typically is diluted to a point sufficient to permit slurry handling and transfer. Those skilled in the art will appreciate that the slurry is diluted to the desired percent solids of the resulting final slurry product. Typically, the slurry is diluted to less than about 77% solids, preferably about 72–76% solids, more preferably about 74% solids at a pH greater than 7, preferably between 7 and 10. The slurry is then screened to remove grit.

The block copolymers useful in the present invention are the AB and BAB block copolymers of BMA//MAA (10//10) and BMA//BMA/MMA (10//5/10). These dispersants AB and BAB and their process of preparation are described in U.S. Pat. Nos. 5,085,698, and 5,310,778 each of which is incorporated herein by reference. As shown above, the dispersants are block copolymers having segments A and B. The A segment is a hydrophobic and serves to link with the pigment. The B block is hydrophilic and serves to disperse the pigment in aqueous media.

In the representation of the dispersants, a double slash indicates a separation between blocks, and a single slash indicates a random copolymer. For example, BMA//MAA (10//10) indicates the A block of BMA and a B block of MAA where each block is 10 monomer units long. In BMA//BMA/MAA (10//5/10), the A block is BMA, 10 monomer units and the B block is a random copolymer of BMA and MAA with 5 monomer units of BMA and 10 monomer units of MAA.

The polymer dispersant BMA//MAA (10/10) may be made as follows:

A 12-liter flask was equipped with a mechanical stirrer, thermometer, $N_2$ inlet, drying tube outlet, and addition funnels. Tetrahydrofuran ("THF"), 3750 gm, and p-xylene, 7.4 gm, were charged to the flask. The catalyst, tetrabutyl ammonium m-chlorobenzoate (3.0 ml of a 1.0M solution in acetonitrile) was then added. Initiator, 1,1-bis(trimethylsiloxy)-2-methyl propene, 291.1 gm (1.25M) was injected. Feed I [tetrabutyl ammonium m-chlorobenzoate, 3.0 ml of a 1.0M solution in acetronitrile] was started and added over 150 minutes. Feed II [trimethylsilyl methacrylate, 1976 gm (12.5M)] was started at 0.0 minutes and added over 35 minutes. One hundred and eighty minutes after Feed II was completed (over 99% of the monomers had reacted), Feed III [butyl methacrylate, 1772 gm (12.5 M)] was started and added over 30 minutes.

At 400 minutes, 780 gm of dry methanol were added to the above solution and distillation was begun. During the first stage of distillation, 1300.0 gm of material with a boiling point of below 55° C. were removed from the flask. The theoretical amount of methoxytrimethylsilane (BP=54° C.) to be removed was 1144.0 gm. Distillation continued during the second stage while the boiling point increased to 76° C. During the second stage of distillation, 5100 gm of i-propanol was added. A total of 8007 gm of solvent were removed.

This made a butyl methacrylate//methacrylic acid 10//10 AB block polymer of 2400 Mn and 52.1% solids.

In the process of preparing the slurry of the present invention, agitator speed is used for improved incorporation of the dry pigment, and combined with the high pigment solids has added benefit of providing an increased shear rate, further enhancing dilatant grinding zones. Specific agitator characteristics depend on the equipment, production rate, blade configuration, etc. For example, agitator tip speed, i.e., linear velocity of an outer tip of a blade on an agitator could range from about 14 to 45 ft/sec. Using a seriated disc type agitator (such as a Hockmeyer blade) with less pumping action, tip speeds in excess of 55 ft/sec may be required. An energy input of up to about 33 kWh/T of material processed may be used, preferably up to 22 kWh/T, and more preferably between 4 to 11 kWh/T.

To maximize optical performance of the slurry, after the dilatant slurry grinding, the diluted slurry may be subjected to a polishing grind. The polishing step is desirable to grind larger particles greater than 10 microns and further deagglomerate particles greater than 0.6 microns. This may be carried out by a media mill as described in U.S. Pat. No. 5,356,470. Contemplated equivalents include a colloid mill, attrition mill, Manton-Gaulin mill, high-speed disperser and the like. Process equipment is commercially available.

In carrying out the invention, the titanium dioxide slurry from step (c) is fed into a grind chamber which is filled with beads. Many types of media or different sizes may be used, with one of ordinary skill in the art being able to adjust the media to produce the desired result based on the size distribution of the particles in the starting material. Typically, a media nominal size range is about 0.3 to 2.5 mm in diameter, preferably about 0.6 to 1.0 mm in diameter, and more preferably 0.8 to 1.0 mm. It has been discovered that smaller size media and/or increased tip speed reduces the size of particles greater than 0.6 microns, particularly greater than 0.6 to 2.0 microns, preferably greater than 0.6 to 1.0 microns. The media is stirred in the grind chamber by a series of discs attached to a rotating shaft. Typically, a media mill disc tip speed is in the range of about 2000 to 3000 ft/min, preferably about 2500 to 2800 ft/min. Average residence times in the media mill will vary depending on the size of the media mill. Typically, average residence times will be between about 1 to 10 minutes, preferably 2.5 to 5 minutes on a 200 L size media mill. If a smaller size media mill is used, a shorter residence time can be used. The motion of the media is perpendicular to the direction in which the slurry is pumped, and therefore the $TiO_2$ particles are sheared by the media. Typically, a screen keeps the media inside the grind chamber but allows the $TiO_2$ slurry out of the mill. Optionally, the product of the mill can be further screened.

Typically, slurries processed according to the invention have, subsequent to media milling, a narrow particle size distribution with a geometric standard deviation, as defined herein below, of less than about 1.62, preferably about 1.40 to 1.48, and $TiO_2$ particles having less than about 25% greater than 0.6 microns, preferably less than about 10 to 20% greater than 0.6 microns as measured by a laser scattering particle size distribution analyzer. The inventors have found that one pass through the media mill is sufficient to refine the optical properties of the present slurry.

Although media milling is needed to fully develop the optical performance of the present slurry, dispersants or grinding aids need not be added before media milling. If necessary to maintain the pH in the desired range of 7–10, preferably 8–10, additional organic amine (the same as used in the grind step under dilatant shear conditions) may be added before media milling.

Titanium dioxide pigments used both dry and in slurries in architectural coatings such as interior gloss, semigloss and flats, have heretofore required wet treatments (deposition on the surface of metal oxides from solutions) to provide pigment surfaces that are dispersion stable and resistant to flocculation in the final coating system. Typically the manufacturing sequence is as follows.

Base pigment produced in the oxidation step of the chloride process or from the precipitation step in the sulfate process are first washed or otherwise treated and washed to remove impurities. At this point the base pigment corresponds to the untreated pigment of the present invention.

The base pigment is then finished to make it suitable for commercial use. One step in the finishing process is to remove the oversized pigment particles and to narrow the range of the particle size distribution of the pigment. To accomplish this step may be dried subjected to some particle size reduction step such as micronizing or milling. Or the wet filter cakes may have the solids content adjusted before milling in a media mill. Organic materials such as TMP may be used in the milling or micronizing step. The next step in finishing is to subjected the pigment to wet treatments to deposit or precipitate on the pigment surface various metal oxides helpful in dispersing and stabilizing the finished pigment in paint and coatings systems. After wet treatment, the pigment is again dried, and milled or micronized before being dispersed as a slurry in a mixture of water and dispersants.

Wet treatment may be a precipitation such as is described in U.S. Pat. No. 3,767,455 or depositions as described in U.S. Pat. No. 5,824,145.

The present invention provides a slurry and a process for making the slurry starting with an unfinished rutile titanium dioxide pigment. Without subjecting the base pigment to any other processing steps other than grinding under dilatant shear conditions in the presence of the dispersants of the present invention, a slurry product is produced that is acceptable for use in architectural paint systems. The process of the present invention eliminates the requirement for wet treatments to finish the pigment's surface and make it suitable for use in architectural coatings or to provide enhanced optical efficiencies in paper and board coatings.

Unfinished pigment slurries, both rutile and anatase, were known before the slurry of the present invention, but these pigments failed to provide the gloss and flocculation resistance needed for use in architectural coatings and efficiencies for paper and board coatings. Such unfinished pigment slurries, even with the addition of accepted, commercial dispersants or with the addition of the dispersant of the present invention failed to provide the stability and flocculation resistance needed in architectural, paper and board coatings.

The present invention provides a slurry product that has stability equal to that of commercial slurry products for architectural coatings and flocculation resistance to provide gloss, tinting strength, and opacity equal to that of a commercial wet treated pigment slurry. This is a surprising combination of properties in view of the elimination of what was heretofore required pigment finishing steps.

What is claimed is:

1. A method for using a rutile titanium dioxide pigment slurry comprising formulating an architectural paint with the rutile titanium dioxide pigment slurry, the rutile titanium dioxide pigment slurry comprising an unfinished rutile titanium dioxide pigment, a dispersant and an organic amine wherein the dispersant is selected from the group consisting of (a) a graft copolymer comprising about 90 to 50% by weight of a polymeric backbone and correspondingly about 10 to 50% by weight of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight based on the weight of the graft copolymer, of polymerized ethylenically unsaturated acid containing monomers; and (2) the side chains are hydrophilic macromonomers attached to the backbone at a single terminal point and consist essentially of polymerized ethylenically unsaturated monomers polymerized in the presence of a cobalt chain transfer agent and contain 20 to 50% by weight, based on the weight of the macromonomer, of polymerized ethylenically unsaturated acid containing monomers and have a weight average molecular weight of about 1,000 to 30,000 and wherein the acid groups of the graft copolymer are neutralized with an inorganic base or an amine; and (b) a block copolymer of type AB and BAB selected from the group consisting of BMA//MAA (10//10) and BMA//BMA/MMA (10//5/10).

2. A method for using a rutile titanium dioxide pigment slurry comprising formulating a coating formulation where universal colorants are used with the rutile titanium dioxide pigment slurry, the rutile titanium dioxide pigment slurry comprising an unfinished rutile titanium dioxide pigment, a dispersant and an organic amine wherein the dispersant is selected from the group consisting of (a) a graft copolymer comprising about 90 to 50% by weight of a polymeric backbone and correspondingly about 10 to 50% by weight of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight based on the weight of the graft copolymer, of polymerized ethylenically unsaturated acid containing monomers; and (2) the side chains are hydrophilic macromonomers attached to the backbone at a single terminal point and consist essentially of polymerized ethylenically unsaturated monomers polymerized in the presence of a cobalt chain transfer agent and contain 20 to 50% by weight, based on the weight of the macromonomer, of polymerized ethylenically unsaturated acid containing monomers and have a weight average molecular weight of about 1,000 to 30,000 and wherein the acid groups of the graft copolymer are neutralized with an inorganic base or an amine; and (b) a block copolymer of type AB and BAB selected from the group consisting of BMA//MAA (10//10) and BMA//BMA/MMA (10//5/10).

* * * * *